Patented Aug. 4, 1925.

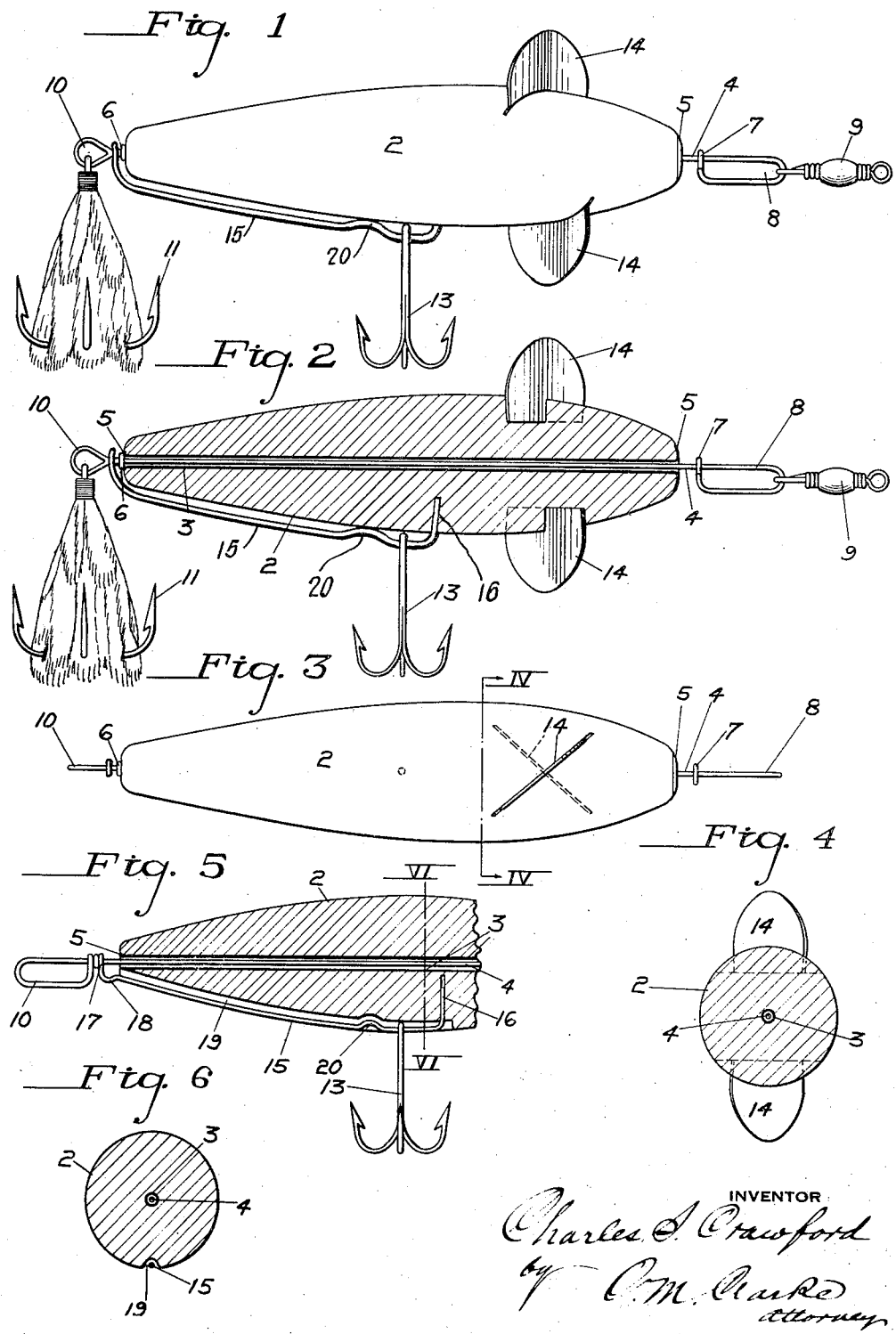

1,548,662

UNITED STATES PATENT OFFICE.

CHARLES S. CRAWFORD, OF PITTSBURGH, PENNSYLVANIA.

ARTIFICIAL BAIT.

Application filed November 24, 1923. Serial No. 676,763.

*To all whom it may concern:*

Be it known that I, CHARLES S. CRAWFORD, a citizen of the United States, residing at Pittsburgh, in the county of Allegheny and State of Pennsylvania, have invented certain new and useful Improvements in Artificial Bait, of which the following is a specification.

My invention consists of an improvement in artificial baits for casting or trolling. It has for its object to provide in such a bait, a fish or cigar-shaped body, freely rotatable on a central stem, and provided with one or more freely connected longitudinally slidable hooks or groups of hooks; also, means for mounting the body on its stem, providing for free rotation, a terminal non-rotating hook or hooks, and spinning wings or vanes for the body, together with other features of improvement, as shall be more fully hereinafter described.

Referring to the drawings:

Fig. 1 is a view of the device in side elevation;

Fig. 2 is a longitudinal vertical sectional view;

Fig. 3 is a plan view;

Fig. 4 is a cross section on the line IV—IV of Fig. 3;

Fig. 5 is a partly broken away sectional view showing a modified construction; and Fig. 6 is a cross section on the line VI—VI of Fig. 5.

The main body portion 2 of the bait is made of wood or other suitable light material, and is generally circular or oval in cross section, to simulate the body of a fish, tapering towards each end, as shown. Extending centrally of the body 2 from front to back is a tubular lining or bearing shell 3 for the reception of the central stem or snood 4, constituting the main tension member of the device. Tube 3 is preferably turned over outwardly flanged around each end of the body as at 5, 5, to form a closely contacting water-tight joint with the tapered terminals of the body, and to form endmost bearings for washers or rings 6, 7, of the central snood 4.

Said snood is just sufficiently smaller than the inner diameter of tube 3 to allow for free rotation of the tube around it, with the body 2, with slight clearance. It is provided at the front with an elongated eye 8 for connection with the usual line by swivel joint 9, and at the rear end with a terminal eye 10 for the attachment of the freely movable hook or hooks 11.

A freely swinging hook or gang of hooks 13 is slidably mounted by eye 12 on a longitudinal slide wire 15, having its front end inserted in the body as at 16 or otherwise suitably secured. The rear end is connected to the central stem 4 beyond the tip of the body as shown. The slide wire 15 lies along the body with slight clearance, and has a bend or kink 20 deflected inwardly sufficiently to retain the hook in the forward position until struck by a fish. In such case, the strain will pull the hook backwardly, past shoulder 20 to the rear end of the slide wire. In such position, closely adjacent to the end hooks 11, the fish will be apt to be also engaged by such hooks, providing double security. If desired, two such gangs of hooks may be similarly connected, at opposite sides, or any desired number at such varying positions annularly and longitudinally of the body 2.

For the purpose of effecting rotation of the body on its snood 4, it is provided with a pair of oppositely located diagonally arranged vanes, fins, or wings 14. These may be of thin light metal, as aluminum, copper, etc., inserted and secured in receiving slots in the wooden body, or otherwise, as preferred. These wings are set in the forward part of the device and as it is drawn through the water, cause the body to spin rapidly and throw the hooks 13 outwardly, as described.

At the same time, the body will assume an approximately horizontal position, tending to lift the rear hooks 11, and causing them to wobble. In this manner, I provide a combined spinner and wobbler, closely imitating a swimming fish.

It will be understood, also, that the body of the bait may be painted or coated in any desired manner or color, for protection and simulation of a natural fish.

In Figs. 5 and 6 I show a modified construction, in which wire 15 is laid along a receiving groove 19, allowing for clearance of the attaching eye of hooks 13. The slide wire is connected around the rear end of stem 4 with a laterally extending loop 18. In such construction the strain will pull the hooks backwardly, past shoulder 20, and into the terminal loop 18, flange 5 being cut away for clearance.

The novel advantages of both forms of the constructions above described are principally due to the free rotation of the body and the centrifugal and sliding action of the body hooks. These, by their rapid free action and scope of movement tend to reach quite beyond the bait proper and to catch a striking fish independently and beyond the reach of the rear terminal hooks 11.

What I claim is:

1. An artificial bait consisting of a central supporting stem and a body freely rotatable thereon having a freely swinging hook longitudinally slidable from the middle portion to the tail portion of the body.

2. An artificial bait consisting of a central supporting stem and a body freely rotatable thereon having a freely swinging hook longitudinally slidable from the middle portion to the tail portion of the body, and subject to centrifugal action upon rotation of the body.

3. An artificial bait consisting of a central supporting stem and a body freely rotatable thereon having rotating vanes and a freely swinging hook longitudinally slidable along the rear portion of the body.

4. In combination with a central stem having a front attaching eye and a rear loosely connected hook, a fish-shaped body provided with a central tube for rotatable mounting on the stem and provided with a centrifugally acting hook slidably mounted along its surface.

5. An artificial bait consisting of a central supporting stem and a body freely rotatable thereon having a slide wire arranged longitudinally of its surface, and a freely swinging hook slidably mounted thereon.

6. An artificial bait consisting of a central supporting stem and a body freely rotatable thereon having a longitudinally arranged slide wire provided with a front retaining shoulder and a rear holding loop, and a freely swinging hook slidably mounted thereon.

7. In an artificial fish bait, the combination with a central supporting stem, of a body freely rotatable thereon having a slide wire extending from the middle portion of the body to its rear end and connected with the central stem immediately in front of a lateral terminal holding loop, and a loosely mounted hook on said slide wire adapted to move backwardly thereon and to engage said terminal loop under strain.

8. In an artificial fish bait, the combination with a central supporting stem, of a body freely rotatable thereon having a slide wire extending from the middle portion of the body to its rear end and connected with the central stem immediately in front of a lateral terminal holding loop, said wire having a deflection near its forward portion for temporarily retaining a hook during normal rotation of the body, and a loosely mounted hook on the slide wire in front of said deflection adapted to move thereover and backwardly along the wire to engage said terminal loop under strain.

9. In an artificial fish bait, the combination with a central supporting stem, of a body freely rotatable thereon having a slide wire extending from the middle portion of the body to its rear end and connected with the central stem immediately in front of a lateral terminal holding loop, a longitudinal groove in the body providing clearance space around the slide wire, and a loosely mounted hook on the slide wire adapted to move backwardly thereon through said groove and to engage said terminal loop under strain.

10. In an artificial bait, the combination with a central supporting stem having a front line-connecting eye and a rear hook-connecting eye, of a body freely rotatable thereon having a slide wire extending along the body with intervening clearance, the rear end of the slide wire being connected with the central stem in front of the rear eye and having a hook retaining deflection forwardly thereof, and a hook loosely mounted on said slide wire normally in front of said deflection adapted to be rotated centrifugally thereby and to slide rearwardly under strain towards the rear hook connecting eye.

In testimony whereof I hereunto affix my signature.

CHARLES S. CRAWFORD.